United States Patent [19]
Banyas et al.

[11] Patent Number: 5,775,466
[45] Date of Patent: Jul. 7, 1998

[54] BICYCLE BRAKING SYSTEM

[76] Inventors: Michael Banyas, 7105 Hunters Branch Dr., Atlanta, Ga. 30328; Paul L. Artigues, 3040 Sumitwood Dr., Kennesaw, Ga. 30144

[21] Appl. No.: 726,852

[22] Filed: Oct. 4, 1996

[51] Int. Cl.$^6$ .................................................. B62L 3/00
[52] U.S. Cl. .................................. 188/24.21; 188/24.22
[58] Field of Search ........................... 188/24.11, 24.21, 188/24.12, 24.13, 24.22, 2 D; 74/501.5 R, 502.6, 502.2, 502.5, 500.5

[56] References Cited

U.S. PATENT DOCUMENTS

| | | |
|---|---|---|
| 3,342,291 | 9/1967 | Warwick ................................. 188/73 |
| 3,776,333 | 12/1973 | Mathauser . |
| 3,993,174 | 11/1976 | Williams et al. . |
| 4,136,759 | 1/1979 | Schoch . |
| 4,391,353 | 7/1983 | Mathauser . |
| 4,585,094 | 4/1986 | Rottenkolber et al. . |
| 4,615,415 | 10/1986 | Mathauser . |
| 4,632,225 | 12/1986 | Mathauser . |
| 4,768,623 | 9/1988 | Nagano . |
| 5,103,938 | 4/1992 | Yoshigai . |
| 5,368,136 | 11/1994 | Walte . |
| 5,417,311 | 5/1995 | Musco, III . |
| 5,431,257 | 7/1995 | Rocca et al. . |

FOREIGN PATENT DOCUMENTS 0902979 10/1952 France .

*Primary Examiner*—Robert J. Oberleitner
*Assistant Examiner*—C. T. Bartz
*Attorney, Agent, or Firm*—Hinkle & Associates, P.C.

[57] ABSTRACT

A non-hydraulic bicycle braking system (2) is composed of a braking arrangement wherein a hand actuator is squeezed at a handle bar to effect movement of a pair of brake pads (94) against the rim (8) of a wheel (6). An actuator cable (116) is operably connected to the hand actuator and mounted to a yoke (134). The yoke is connected to a brake cable which is attached to separate arms (38) that are pivotally mounted at a pivot end (46) to brake mounting brackets (14). Each mounting bracket is separately mounted to spaced apart wheel posts (4). Each arm is pivotally mounted to a piston (68) which, in turn, has the brake pad. Although the arms move through an arc when actuated, all circular arc movements of the arm are taken up in the piston; thereby, leaving the piston to move in a straight manner without deviating in a circular movement.

18 Claims, 4 Drawing Sheets

Fig_1

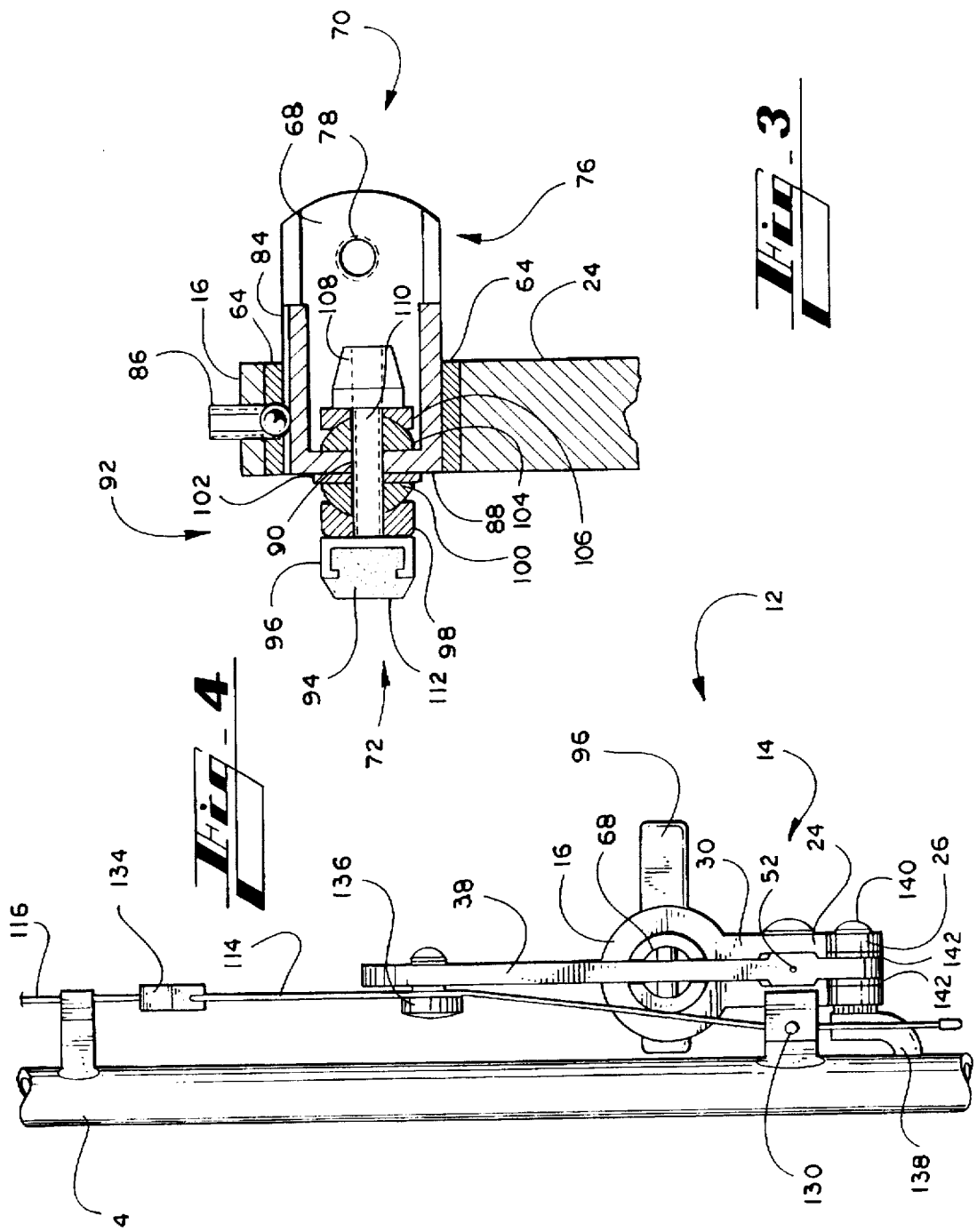

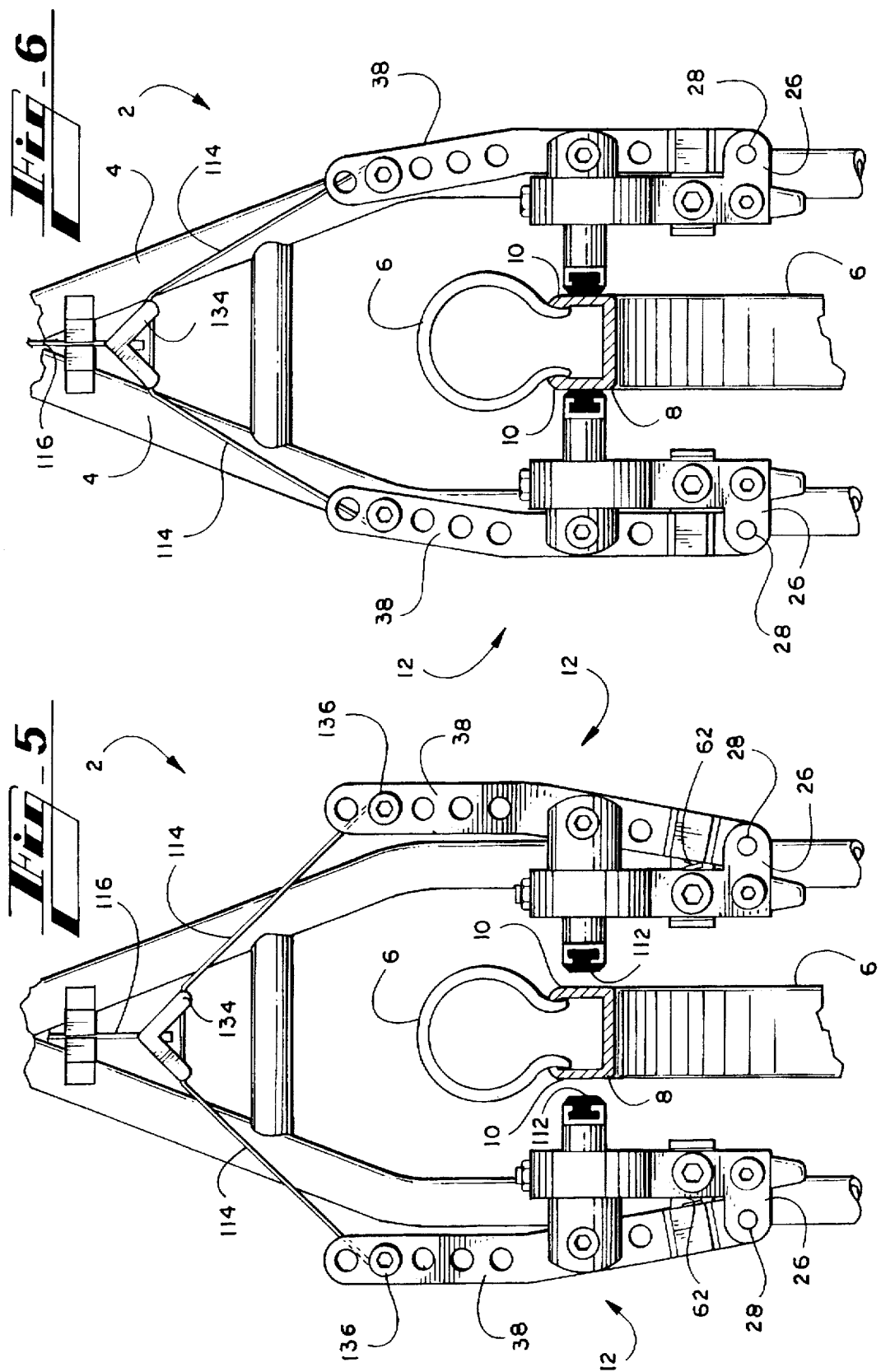

BICYCLE BRAKING SYSTEM

BACKGROUND OF THE INVENTION

I. Field of the Invention

The present invention relates generally to the field of hand actuated bicycle brakes. More particularly, the present invention relates to a non-hydraulic, piston driven braking system for bicycles.

II. Description of the Related Art

Bicycle brake assemblies commonly employ a pair of cantilevered brake arms that are pivotally mounted to the bicycle frame. Upon actuation, the brake arms are displaced by a cable so that brake pads mounted to the brake arms move along an arched path to engage both sides of a rim of a bicycle wheel. Over time, the brake pads wear unevenly and result in reduced braking performance.

Maximum braking is obtained by parallel, direct line application of the brake pads to the rim. An early attempt to provide direct line application is a braking device described by Durif in French Patent Number 56,689. This device has a post mounted to each leg of a wheel mounting bracket. Disposed through the post is a bore which is aligned along an axis substantially perpendicular to the surface of a wheel rim. Slidingly mounted through the bore is a shaft having a brake pad mounted at one end and a brake pulley mounted at the other end. A brake cable is mounted at each end thereof to a leg below each post, which is threaded across each brake pulley and through an actuation pulley. The actuation pulley is operably connected to a hand actuator by a actuator cable so that as the hand actuator is activated, the actuator pulley is moved in an upward direction. This upward movement of the actuator cable causes the brake cable to likewise move upwardly and force the shaft to slide toward the rim, causing the brake pads to brakingly engage the rim. Upon release of the hand actuator, a spring operably engaged to each shaft causes the shafts to slide away from the rim. However, because each pulley is on the opposite end of the shaft from the brake pad, there is no leverage advantage. This makes it very difficult for a rider to bring the bicycle to a stop.

Subsequently, hydraulic braking systems have been developed to provide direct line application of the brake pads to the rim. Hydraulic systems of this type are described in U.S. Pat. Nos. 3,776,333 and 4,615,415 by Mathauser, and U.S. Pat. No. 4,585,094 by Rottenkolber et al. The devices described therein generally provide a master/slave hydraulic piston driven system which directs a pair of brake shoes in engagement with the rim. Some of these systems need regular servicing to bleed air from the system and generally, they are undesirably heavy.

A bicycle rim brake describe by Schoch in U.S. Pat. No. 4,136,759 has an extendible and retractable brake member slidably mounted in an opening formed in a support for movements toward and away from the rim. To actuate the brake member, an operator pulls a brake cable which is attached to a pivotally mounted arm. The arm has a semicircularly-shaped cam which slidably contacts the brake member along the arc of the cam. As the operator pulls the brake cable, the arm pivots and causes the cam to push the brake member into the rim. However, once the brake member contacts the apex of the arc, the cam can not push the brake member any further toward the rim, which can ultimately result in brake failure. Also, the cam and the brake member wear through use.

In U.S. Pat. No. 5,417,311 described by Musco, III, a bicycle brake assembly has a substantially U-shaped brake arm assembly without the use of hydraulics. However, this assembly has a resiliently flexible upper arm portion connected to a downwardly and inwardly extending relatively inflexible lower arm portion. Mounted to the lower arm portion is a shaft having a brake pad mounted to the end thereof to engage the rim. The movement of the shaft is in an arched path and results in uneven wearing and application of braking forces.

Recently, Shimano disclosed a V-brake bicycle braking device. This device has a pair of extremely elongated arms, each of which are individually, pivotally mounted at the lower end thereof to a leg of a wheel mount on either side of the wheel. Pivotally mounted to each arm proximate the lower one-half portion of each arm is a brake pad. Operably and pivotally mounted to both the brake pad and the arm at the lower end is an adjusting bracket. The adjusting bracket is designed to maintain the brake pad in a parallel engaging relationship with the rim. Mounted to the opposite end of each arm is a cable that is connected to a hand actuator. Due to the extreme length of the arm, which increases leverage for the application of the brake pads to the rim in order to maintain the parallel engagement, the hand actuator provides at least 1.25 inches of cable retraction to properly actuate the brake pads. Also, the V-brake bicycle braking device has very little modulation and results in almost instantaneous wheel lock. Typical hand actuators in the bicycle industry provide one-half to three-quarters of an inch of cable retraction. As a result, this device is not interchangeable with other hand actuators in the industry.

SUMMARY OF THE INVENTION

In accordance with the present invention and the contemplated problems which have and continue to exist in this field, the objectives of this invention are to provide a bicycle braking system that provides:

A brake pad substantially parallel to a rim of a wheel that is actuated in a straight and true manner;

A piston which is guided by a cylindrically shaped head of a brake mounting bracket;

An arm to actuate the piston, that is adjustable for desired leverage, desired modulation, and properly matching the leverage ratio of the hand actuator;

A light-weight brake assembly; and

Universal adaptability for any bicycle having a cable receiving, hand actuator and wheel posts.

This invention accomplishes the above and other objectives and overcomes the disadvantages of the prior art by providing a bicycle braking system that is simple in design and construction, inexpensive to fabricate, and easy to use. A bicycle braking system is composed of a braking arrangement wherein a hand lever is squeezed at the handle bar to effect the braking system by moving a pair of brake pads against the metal rim of a bicycle wheel by use of a cable. The cable splits into two parts at a juncture and each part is thereafter attached to separate arms that are pivotally mounted at one end to brake mounting brackets that are mounted to spaced apart wheel posts. Each arm is pivotally mounted to a piston which, in turn, has the brake pad for engaging the rim. Although the arms are caused to move through an arc when actuated, the pistons move in a straight line through an aperture and project the brake pad substantially parallel to the rim in a straight and true manner. All circular arc movements of the arm are taken up at the piston; thereby, leaving the piston to move in a straight manner without deviating in a circular movement.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Other objects, advantages and capabilities of the invention will become apparent from the following description taken in conjunction with the accompanying drawings showing the preferred embodiment of the invention.

BRIEF DESCRIPTION OF THE DRAWINGS

The invention will be better understood and the above objects as well as objects other than those set forth above will become apparent when consideration is given to the following detailed description thereof. Such description makes reference to the annexed drawings wherein:

FIG. 3 is a partial, side view of a brake mounting bracket with a piston and a brake pad assembly of the bicycle braking system of FIG. 1;

FIG. 4 is a rear elevation view of the bicycle braking system of FIG. 1 which is mounted to a given wheel post;

FIG. 5 is a front elevation view of the bicycle braking system of FIG. 1 prior to the actuation; and, FIG. 6 is the front elevation view of view of the bicycle braking system of FIG. 1 after actuation.

DESCRIPTION OF THE PREFERRED EMBODIMENTS

Figure 1:
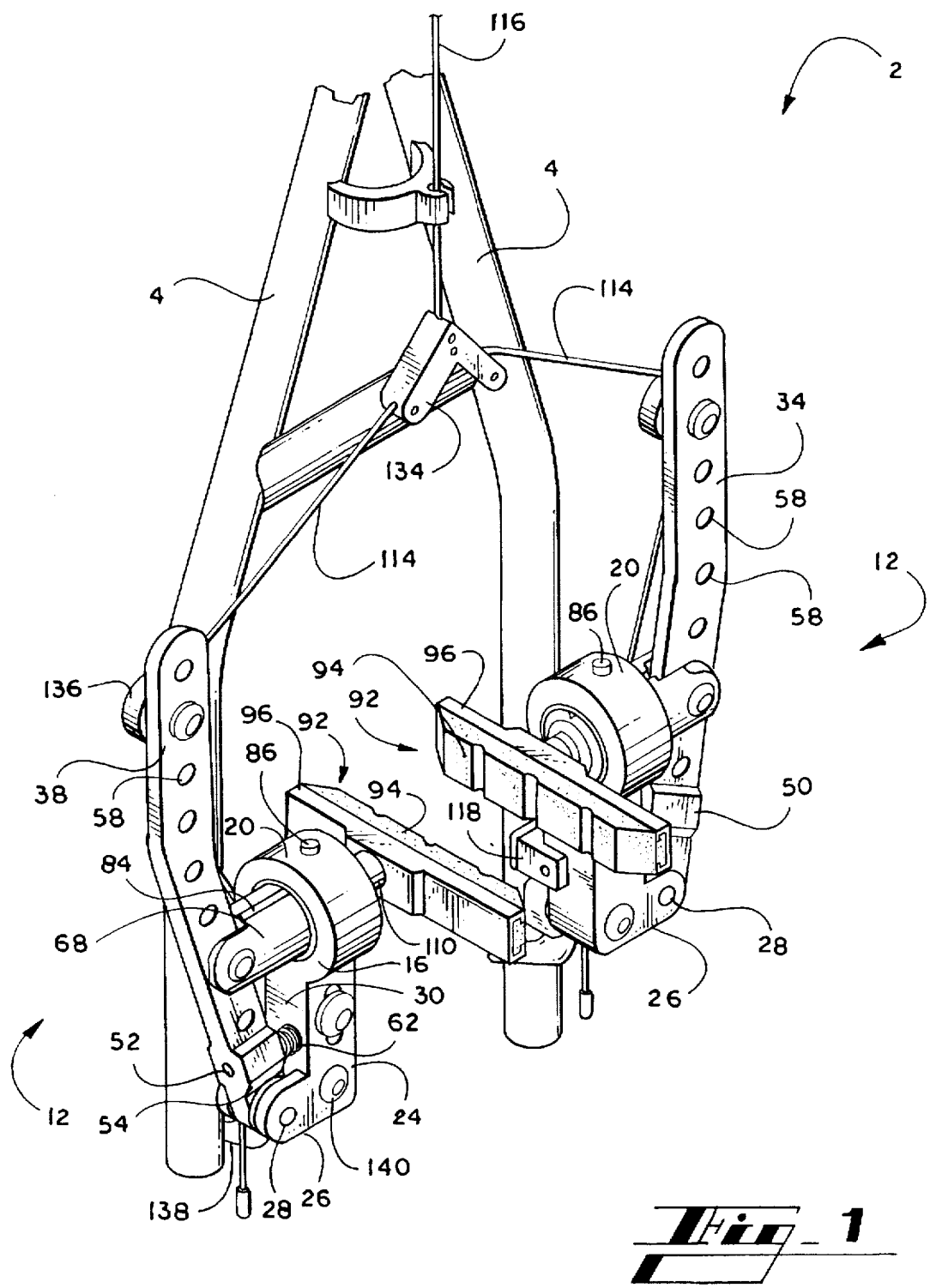
FIG. 1 is a perspective view of a bicycle braking system constructed in accordance with the present invention and shown mounted on a pair of spaced apart wheel posts of a bicycle frame adapted to receive a wheel including a rim.

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIG. 1. FIG. 1 of the drawings illustrates a bicycle braking system 2 constructed in accordance with the present invention. Being universally adaptable, the bicycle braking system 2 is used with a bicycle (not shown) that has a hand actuator (not shown) mounted on a handle bar (not shown) and a pair of wheel posts 4 straddling a wheel 6, as shown in FIGS. 5 and 6. Commonly, the wheel 6 is mounted on a rim 8 that has rim braking surfaces 10 facing the wheel posts 4. The bicycle braking system 2 has a pair of brake assemblies 12 which are duplicates of one another. Each brake assembly 12 is mounted to a given wheel post 4 and aligned opposite the companion brake assembly 12.

Figure 2:
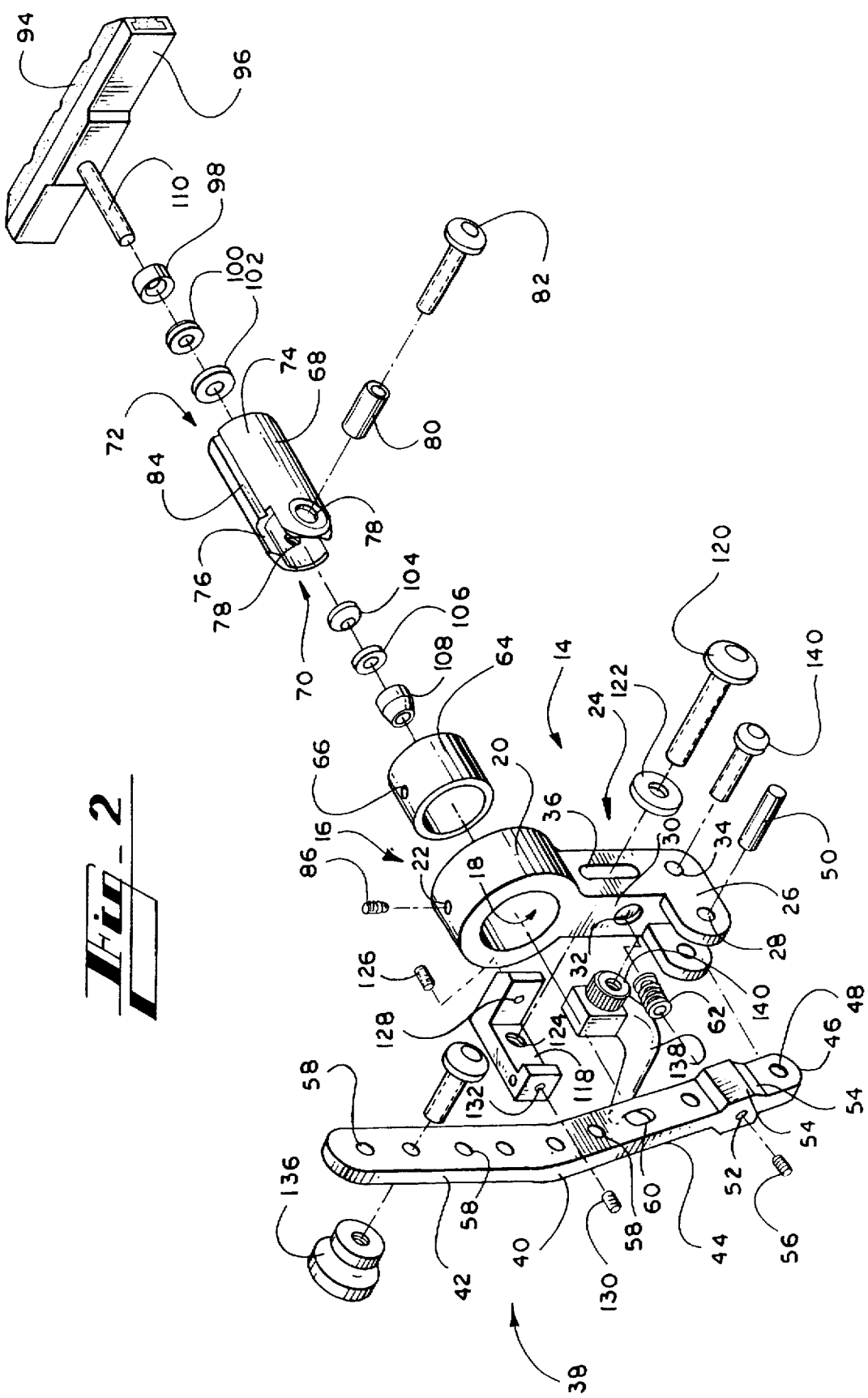
FIG. 2 is a perspective, exploded view of a brake assembly of the bicycle braking system of FIG. 1 which is mounted to a given wheel post.

As shown in FIGS. 2, 5 and 6, central to the brake assembly 12 is a brake mounting bracket 14 mounted to the wheel post 4 proximate the rim 8. The brake mounting brackets 14 are placed in opposed alignment with one another. On the upper portion of the brake mounting bracket 14 is a cylindrically shaped head 16 having an aperture 18 and a circumferential surface 20. Between the aperture 18 and the circumferential surface 20 is a threaded head bore 22. Comprising the lower portion of the brake mounting bracket 14 is a substantially L-shaped body 24 depending from the head 16. Distally located from the head 16, the body 24 has a pair of depending, spaced apart pivot walls 26. Each pivot wall 26 has a pivot wall bore 28, and the pivot wall bores 28 are concentrically aligned along a pivot axis between the pivot bores 28. Adjacent the pivot walls 26, the body 24 has a face 30 and disposed on the face is a spring bore 32. Proximate the pivot walls 26, the body 24 has a stabilizer bore 34 which is substantially parallel to the pivot axis. Also disposed through the body 24 is a mounting slot 36 located proximate the head 16.

Referring now to FIGS. 1, 2 and 4, an arm 38 is pivotally mounted to the brake mounting bracket 14. In the preferred embodiment, the arm 38 has a bend 40, which forms upper and lower arm portions 42 and 44. The lower arm portion 44 has a pivot end 46 and an arm pivot bore 48 proximate the pivot end 46. For mounting purposes, the pivot end 46 of the lower arm portion 44 is placed between the pivot walls 26 so that the arm pivot bore 48 is concentrically aligned along the pivot axis. A split-cylinder pin 50 is inserted through the pivot wall and arm pivot bores 28 and 48, pivotally mounting the arm 38 to the brake mounting bracket 14. Proximate the pivot end 46 is a threaded spring chamber 52 having spring chamber walls 54. To vary the depth of the spring chamber 52, a threaded spring tension screw 56 matingly engages the threads of the spring chamber 52. The spring tension screw 56 is manually adjustable by an operator to a desired depth within the spring chamber 52. Aligned along the arm 38 are spaced apart arm bores 58. An oval shaped connector bore 60 is disposed on the arm 38 proximate an intersection of the arm 38 and a longitudinal axis of the head 16.

Disposed between the brake mounting bracket 14 and the arm 38 is a spring 62 for biasing the arm 38 to pivot away from the wheel 6. The spring 62 is disposed at one end within the spring chamber 52 and at the other end within the spring bore 32. As previously stated, the spring tension screw 56 is manually adjustable to vary the depth of the spring chamber 52. This in turn varies the compression of the spring 62 and results in the spring 62 having an adjustable biasing force.

Referring to FIGS. 2 and 3, a cylindrical bushing 64 having an outside diameter that matingly engages the aperture 18 and a longitudinal length substantially equal to the longitudinal length of the head 16 is disposed within the aperture 18. The bushing 64 has a bushing bore 66 concentrically aligned and congruent with the head bore 22.

A piston 68 having a first end 70, a second end 72 and a piston surface 74 is disposed within and slidably engages the bushing 64. Proximate the first end 70, the piston has an arm slot 76 and a pair of piston bores 78 opposite one another and aligned along a diameter of the piston 68. The arm 38 is placed within the arm slot 76 and the connector bore 60 is aligned with the piston bores 78. Disposed through the connector and piston bores 60 and 78 is a hollow, cylindrical sheath 80. A pivot screw 82 is inserted through the sheath 80 and pivotally mounted to the piston 68, which pivotally mounts the piston 68 to the arm 38. On the piston surface 74 is a groove 84 which is rollingly engaged by a threaded ball plunger 86 to prevent the piston from rotating within the aperture. The threaded ball plunger 86 matingly engages the head bore 22 and is disposed through the bushing bore 66. Across the second end 72 is a substantially planar cap 88 having a cap bore 90.

Mounted to the second end 72 of the piston 68 is a brake pad assembly 92 to brakingly engage the rim 8 of the wheel 6. The brake pad assembly 92 has a brake pad 94 mounted to a brake pad carrier 96 and an external spacer washer 98, an external spacer 100, a cap washer 102, an internal spacer 104, an internal spacer washer 106 and a lock nut 108. Depending from the brake pad carrier 96 is a threaded stem 110, and the brake pad assembly 92 is mounted to the piston by placing the external spacer washer 98, the external spacer 100 and the cap washer 102 onto the stem 110, inserting the stem 110 through the cap bore 90, and placing the internal spacer 104, the internal spacer washer 106 and the lock nut 108 on the stem 110. In the preferred embodiment, the brake pad assembly 92 is adjacent to the rim 8 and is oriented so that a pad braking surface 112 of the brake pad 94 is parallel to the rim braking surface 10 of the rim 8.

The arms 38 are operably connected to the hand actuator by a brake cable 114 and an actuator cable 116. The brake cable 114 is mounted to the bicycle braking system 2 by a cable bracket 118 in each brake assembly 12. To receive and engage the brake cable 114, the cable bracket is mounted to the wheel post 4 by a mounting screw 120 inserted through a mounting washer 122, the mounting slot 36 of the conjunctive brake mounting bracket 14 and a cable bracket bore 124 and securing the mounting screw 120 to that wheel post 4. Providing height adjustability to the brake mounting bracket 14, a threaded first set screw 126 is provided which matingly engages a threaded first bracket hole 128 and applies pressure to the brake mounting bracket 14, locking the brake mounting bracket 14 at the desired height. The brake cable 114 is mounted within the cable bracket 118 by a threaded second set screw 130 screwed into a threaded second bracket hole 132. Disposed on the brake cable 114 is a V-shaped yoke 134. The actuator cable 116 is operably connected to the hand actuator and mounted to the yoke 136. Operably connecting the arms 38 to the hand actuator is a cable guide 136, as shown in FIG. 4, that is removably mounted to each arm 38 at a preselected arm bore 58. The cable guide 136 slidingly engages the brake cable 114 as the bicycle braking system 2 is actuated.

A stabilizer 138 is provided to prevent rotational movement of the brake mounting bracket 14 as the hand actuator is activated. One end of the stabilizer 138 is mounted to the brake mounting bracket 14 by a stabilizer screw 140 that is inserted through the stabilizer bore 34 to engage a threaded stabilizer port 140 of the stabilizer 138. The other end of the stabilizer 138 engages the conjunctive wheel post 4.

To assist the pivoting action of the arm 38, plastic pivot washers 142 can be placed between the arm 38 and the pivot walls 26.

Referring now to FIGS. 5 and 6, upon actuation of the hand actuator, the actuator cable 116 is retracted toward the hand actuator. This action causes the yoke 134 to move upwardly and away from the brake assemblies 12. As the yoke 134 rises, the arms 38 are forced inwardly by the brake cable 114. As the arms 38 move in an arc, the pistons 68 pivot about the arms 38 and retain a straight and true path toward the rim 8 in the apertures 18. This movement results in the pad braking surfaces 112 engaging the rim braking surfaces 10 in a parallel manner. When the hand actuator is released, the springs 62 force the arms 38 outwardly from the wheel 6 and the brake and actuator cables 114 and 116 return to their original positions.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. An arm and piston brake assembly for a bicycle having a hand actuator and a pair of wheel posts straddling a wheel including a rim, comprising:

a brake mounting bracket mounted to each wheel post proximate the rim, the brake mounting brackets opposing one another and having a head, the head having an aperture;

an arm pivotally mounted to each brake mounting bracket, each arm being operably connected to the hand actuator and having an elongated connector bore;

a piston pivotally connected to each arm and disposed within the aperture to slidably engage the head of the conjunctive brake mounting bracket, the piston having a piston bore and a pivot screw, the pivot screw being disposed through the piston bore and the connector bore; and a brake pad assembly mounted to each piston to brakingly engage the rim of the wheel.

2. A brake assembly as claimed in claim 1, further comprising a brake cable operably connected to both arms, a yoke operably mounted to the brake cable and an actuator cable being operably connected to the hand actuator and mounted to the yoke, whereby actuation of the hand actuator pivots the arms toward the wheel by the retraction of the actuator cable to cause both brake pad assemblies to engage the rim.

3. A brake assembly as claimed in claim 2, further comprising a cable bracket mounted to each wheel post substantially adjacent to the conjunctive brake mounting bracket for receiving and engaging the brake cable.

4. A brake assembly as claimed in claim 2, further comprising a cable guide removably mounted to each arm to slidingly engage the brake cable.

5. A brake assembly as claimed in claim 3, further comprising a cable guide removably mounted to each arm to slidingly engage the brake cable.

6. A brake assembly as claimed in claim 1, further comprising a spring disposed between each arm and the conjunctive brake mounting bracket for biasing the arm to pivot away from the wheel.

7. A brake assembly as claimed in claim 6, wherein the brake mounting bracket has a body depending from the head and the body has a spring bore to receive one end of the spring, and the arm has a threaded spring chamber to receive the other end of the spring, the spring chamber having a matingly threaded spring tension screw to vary the depth of the spring chamber and adjust the biasing force of the spring.

8. A brake assembly as claimed in claim 1, wherein the arm has a pivot end, the brake mounting bracket has a pair of spaced apart pivot walls, and the pivot end is pivotally mounted to the brake mounting bracket between the pivot walls.

9. A brake assembly as claimed in claim 1, wherein the piston has a groove and the head has a threaded head bore, and further comprises a threaded ball plunger matingly engaging the head bore and rollingly engaging the groove to prevent the piston from rotating within the aperture.

10. A brake assembly as claimed in claim 1, further comprising a bushing disposed within the aperture to slidingly engage the piston.

11. A brake assembly as claimed in claim 9, further comprising a bushing disposed within the aperture to slidingly engage the piston, the bushing having a bushing bore concentrically aligned and congruent with the head bore.

12. A brake assembly as claimed in claim 1, further comprising a stabilizer mounted at one end thereof to the brake mounting bracket and the other end engaging the wheel post to prevent rotational movement of the brake mounting bracket as the hand actuator is activated.

13. A brake assembly as claimed in claim 1, wherein the arm has spaced apart arm bores to adjust the operable connection to the hand actuator.

14. A brake assembly as claimed in claim 4, wherein the arm has spaced apart arm bores to receive and provide adjustment for the cable guide.

15. A brake assembly as claimed in claim 1, wherein the brake pad assembly has a pad braking surface oriented adjacent and substantially parallel to a rim braking surface of the rim.

16. An arm and piston brake assembly for a bicycle having a hand actuator and a pair of wheel posts straddling a wheel including a rim, comprising:

a brake mounting bracket mounted to each wheel post proximate the rim, the brake mounting brackets opposing one another and having a head, the head having an aperture, a threaded head bore and a body depending from the head, and the body having a spring bore and a pair of spaced apart pivot walls;

a bushing disposed within the aperture, the bushing having a bushing bore concentrically aligned and congruent with the head bore;

an arm being operably connected to the hand actuator and having a threaded spring chamber, spaced apart arm bores and a pivot end, the pivot end being pivotally mounted to the brake mounting bracket between the pivot walls, the spring chamber having a matingly threaded spring tension screw to vary the depth of the spring chamber;

a piston pivotally mounted to each arm and disposed within the aperture to slidably engage the bushing, the piston having a groove;

a threaded ball plunger matingly engaging the head bore, disposed through the bushing bore and rollingly engaging the groove to prevent the piston from rotating within the aperture;

a brake pad assembly mounted to each piston to brakingly engage the rim of the wheel; the brake pad assembly being substantially adjacent to the rim and having a pad braking surface oriented substantially parallel to a rim braking surface of the rim;

a brake cable operably connected to both arms;

a yoke operably mounted to the brake cable;

an actuator cable being operably connected to the hand actuator and mounted to the yoke to operably connect the arms to the hand actuator;

a cable guide removably mounted to each arm at one of the arm bores to slidingly engage the brake cable;

a cable bracket mounted to each wheel post and the conjunctive brake mounting bracket for receiving and engaging the brake cable;

a spring for biasing the arm to pivot away from the wheel, the spring being disposed at one end within the spring chamber and at the other end within the spring bore; and a stabilizer mounted at one end thereof to the brake mounting bracket and the other end engaging the wheel post to prevent rotational movement of the brake mounting bracket as the hand actuator is activated.

17. An arm and piston brake assembly for a bicycle having a hand actuator and a pair of wheel posts straddling a wheel including a rim, comprising:

a brake mounting bracket mounted to each wheel post proximate the rim, the brake mounting brackets opposing one another and having a head, the head having an aperture, the brake mounting bracket having a body depending from the head and the body having a spring bore;

an arm pivotally mounted to each brake mounting bracket, each arm being operably connected to the hand actuator, the arm having a threaded spring chamber, the spring chamber having a matingly threaded spring tension screw to vary the depth of the spring chamber;

a piston pivotally mounted to each arm and disposed within the aperture to slidably engage the head of the conjunctive brake mounting bracket;

a spring disposed between each arm and the conjunctive brake mounting bracket for biasing the arm to pivot away from the wheel, the spring being disposed at one end within the spring chamber and at the other end within the spring bore; and a brake pad assembly mounted to each piston to brakingly engage the rim of the wheel.

18. A brake assembly as claimed in claim 1, wherein the piston has an arm slot and the respective arm is pivotally connected to the piston within the arm slot.

* * * * *